United States Patent
Okada et al.

(10) Patent No.: US 8,925,415 B2
(45) Date of Patent: Jan. 6, 2015

(54) STEERING LOCK DEVICE

(75) Inventors: Takahiro Okada, Yokohama (JP); Kenjirou Hayashi, Atsugi (JP)

(73) Assignees: Alpha Corporation, Yokohama-Shi, Kanagawa (JP); Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/006,994

(22) PCT Filed: Mar. 23, 2012

(86) PCT No.: PCT/JP2012/002014
§ 371 (c)(1),
(2), (4) Date: Sep. 24, 2013

(87) PCT Pub. No.: WO2012/137435
PCT Pub. Date: Oct. 11, 2012

(65) Prior Publication Data
US 2014/0013895 A1 Jan. 16, 2014

(30) Foreign Application Priority Data
Apr. 4, 2011 (JP) .................. 2011-082641

(51) Int. Cl.
*B60R 25/02* (2013.01)
*B62D 1/16* (2006.01)
*B60R 25/0215* (2013.01)

(52) U.S. Cl.
CPC ............ *B62D 1/16* (2013.01); *B60R 25/02153* (2013.01)

USPC .............................. 74/495; 70/252

(58) Field of Classification Search
CPC .................... B60R 25/02153; B60R 25/0215; B60R 25/021; B60R 25/02; B62D 1/16
USPC ...................... 74/495; 70/252, 237
See application file for complete search history.

(56) References Cited

U.S. PATENT DOCUMENTS 8,205,517 B2 * 6/2012 Fukushima et al. ............ 74/409

FOREIGN PATENT DOCUMENTS

| DE | 102008037791 | 3/2009 | |
|---|---|---|---|
| DE | 112007002415 | 9/2009 | |
| EP | 1182104 | 2/2002 | |
| EP | 1410963 | 4/2004 | |
| JP | 2009248843 | 9/2008 | |
| WO | WO 2010016458 A1 * | 2/2010 | |
| WO | WO 2010024386 A1 * | 3/2010 | .............. B60R 25/02 |

* cited by examiner

*Primary Examiner* — Keith Frisby
(74) *Attorney, Agent, or Firm* — Nath Goldberg & Meyer; Jerald L. Meyer; Stanley N. Protigal

(57) ABSTRACT

On at least either one of an inside of an opening edge of a cover (2) and an outside of an opening edge of a frame (3), an inclined portion (95) is formed, and on the other of the inside of the opening edge of the cover (2) and the outside of the opening edge of the frame (3), an inclination receiving portion (96) is formed. In such a way, in an event where external force is applied to the inclined portion (95) from an outside, the inclination receiving portion (96) slides on the inclined portion (95), and positionally shifts or falls off the cover (2).

7 Claims, 7 Drawing Sheets

STEERING LOCK DEVICE

This is a National Phase Application filed under 35 U.S.C. 371 as a national stage of PCT/JP2012/002014, filed Mar. 23, 2012, and claims priority from Japanese Application No. 2011-082641, filed Apr. 4, 2011, the content of each of which is hereby incorporated by reference in its entirety.

TECHNICAL FIELD

The present invention relates to a steering lock device that locks rotation of a steering shaft of an automobile.

BACKGROUND ART

As this type of conventional steering lock device, there is one disclosed in Japanese Patent Laid-Open Publication No. 2009-248843 (Patent Literature 1). As shown in FIG. 1, this steering lock device 100 includes: a lock member 102 that is urged in a direction (upward direction of FIG. 1) of a steering shaft (not shown) of an automobile by a coiled spring 101, and is fittable to the steering shaft; a drive body 103 that drives this lock member 102; and an auxiliary lock mechanism 120 that is arranged in the vicinity of the lock member 102, and is capable of locking the lock member 102 at a steering lock position. Moreover, the drive body 103 includes: a rotation member 106 to be driven by a motor 105 through a worm (not shown); and a cam member 107 that moves reciprocally in a moving direction of the lock member 102 by rotation of this rotation member 106, and this cam member 107 is coupled to the lock member 102 through a coupling pin 108. The auxiliary lock mechanism 120 is composed of a slide plate 104, a holding shaft 113, spring members 111a and 111b, and a holding member 115.

The slide plate 104 includes an engagement projection 110 capable of engaging with an engagement groove 109 of a side portion of the lock member 102, and is urged in a direction of the lock member 102 by the spring member 111a. Moreover, the holding shaft 113 is extended from a back surface of a frame cover 112 along the moving direction of the lock member 102 toward the slide plate 104. A tip end portion 113a of this holding shaft 113 engages with an engagement groove portion 114 of the slide plate 104, whereby the slide plate 104 is kept in a state of being spaced apart from the lock member 102.

By the spring member 111b, the holding shaft 113 is urged in a direction of being spaced apart from the slide plate 104. Moreover, an engagement pin 116 is extended from the holding member 115 detachably fitted into the back surface of the frame cover 112. A tip end of this engagement pin 116 engages with a rear end portion 113b of the holding shaft 113, whereby a state where the holding shaft 113 engages with the slide plate 104 is kept.

In the above-described configuration, when the motor 105 is rotated in a lock direction at the time of parking, the rotation member 106 rotates by drive force of the motor 105, and the cam member 107 moves in the lock direction (upward direction of FIG. 1) of the lock member 102. Therefore, the lock member 102 positionally shifts to the steering lock position by urging force of the coiled spring 101. As a result, a tip end of the lock member 102 fits to the steering shaft, and rotation of the steering shaft is inhibited, and accordingly, the automobile turns to an unsteerable state.

Thereafter, when the motor 105 is rotated in a lock release direction, the rotation member 106 rotates in a reverse direction, and the lock member 102 positionally shifts to a lock release position together with the cam member 107. As a result, the fitting of the lock member 102 to the steering shaft is released, accordingly, the rotation of the steering shaft becomes free, and the automobile turns to a steerable state.

Moreover, in a steering lock state, the holding shaft 113 protrudes from the back surface of the frame cover 112 toward the slide plate 104, and a tip end thereof engages with the engagement groove portion 114 of the slide plate 104. In such a way, the slide plate 104 is kept in a state of being spaced apart from the lock member 102.

Subsequently, in the case where external force is applied to the steering lock device 100 from the frame cover 112 side at the time of parking such a vehicle, the holding member 115 falls off from the back surface of the frame cover 112, and moves a tapered portion 112a. In such a way, the engagement between the engagement pin 116 and the holding shaft 113 is disengaged, the holding shaft 113 moves to the frame cover 12 side, and the holding shaft 113 separates from the engagement groove portion 114 of the slide plate 104. Therefore, the slide plate 104 is urged in the direction of the lock member 102 by the spring member 111a, and the engagement projection 110 engages with the engagement groove 109 of the side portion of the lock member 102. In such a way, the lock member 102 is stopped at the steering lock position, accordingly, the rotation of the steering shaft is inhibited, a malfunction that the vehicle becomes steerable by an illegal lock release operation can be prevented, and stealing-proof of the vehicle at the time of parking the vehicle can be enhanced.

CITATION LIST

Patent Literature

[PTL 1]
Japanese Patent Laid-Open Publication No. 2009-248843

SUMMARY OF INVENTION

Technical Problem

However, in the conventional steering lock device 100, such a configuration in which the holding member 115 is fallen off by the external force applied to the frame cover 12 side is adopted, and accordingly, it is necessary to pay attention to handling of the assembled steering lock device 100 during a period until the steering lock device 100 concerned is assembled to a vehicle body. In addition, there is no means for confirming, from the outside, whether or not the holding member 115 is located at such a normal position or falls off, and lack of reliability has been a problem.

In this connection, it is an object of the present invention to provide a steering lock device having an auxiliary lock mechanism provided with high reliability to ensure reliable activation without complicating a configuration of the auxiliary lock mechanism concerned.

Solution to Problem

In order to achieve the foregoing object, a first aspect of the present invention provides a steering lock device comprising: a cover; a frame covered with the cover; a lock member arranged in the frame freely movably between a steering lock position and a steering lock release position; and an auxiliary lock mechanism operable in response to a load from the cover so as to hold the lock member at the steering lock position at an illegal unlocking, wherein an inclined portion is formed on either one of an inside of the opening edge of the cover and an outside of an opening edge of the frame, and an inclination receiving portion is formed on the other of the inside of the opening edge of the cover and the outside of the opening edge of the frame, and wherein the cover has an urging force toward the inside of the opening edge of the cover.

A second aspect of the present invention provides a steering lock device comprising: a cover; a frame covered with the cover, the frame being provided with a rod guide hole; a lock member arranged in the rod guide hole freely slidably between a steering lock position and a steering lock release position, the rod guide hole being provided in the frame; an auxiliary lock mechanism including an auxiliary engagement portion provided on the lock member, an auxiliary lock member that is arranged in the frame freely slidably between an auxiliary lock position and an auxiliary lock release position, and is urged by an urging member to a lock position side of engaging with the auxiliary engagement portion, and a holding member having one end fixed to the cover, in which, in a state where the cover is assembled to the frame, a tip end of the holding member makes engagement with a holding/receiving portion of the auxiliary lock member located at the auxiliary lock release position, and holds the auxiliary lock member at the auxiliary lock release position, and in an event where the cover relatively moves from the frame, the engagement with the holding/receiving portion is disengaged; and a positional shift guide mechanism including an inclined portion set on either one of an outside of an opening edge of the frame and an inside of the opening edge of the cover, the inclined portion being set to obliquely intersect an outer side surface coming close thereto, and an inclination receiving portion set on a region opposed to the inclined portion, the region belonging to other of the outside of the opening edge of the frame and the inside of the opening edge of the cover, the inclination receiving portion being set to enable the inclined portion to slide thereon.

In embodiments, the cover may be formed of a hard and flexible material. Moreover, the cover may be formed of a synthetic resin material.

Moreover, the inclined portion may be set to obliquely intersect a direction where the cover is assembled to the frame.

Moreover, the steering lock device may further include: a cover fixing structure composed of a frame-side engagement portion arranged on the outer side surface of the frame and of a cover-side engagement portion that is arranged on an inner side surface of the cover and is engaged with the frame-side engagement portion in the state where the cover is assembled to the frame, wherein, in the state where the cover is assembled to the frame, at least either one of opposed surfaces of the frame-side engagement portion and the cover-side engagement portion may be set to obliquely intersect the direction where the cover is assembled to the frame.

Moreover, the inclined portion may be arranged on a region of the cover or of the frame, the region being exposed without being surrounded by peripheral vehicle equipment in a state where the steering lock device is attached to a vehicle.

Advantageous Effects of Invention

In accordance with the above-described configuration, the holding member is fixed to the cover, whereby the cover is assembled to a normal assembly position. In such a way, it is clarified that the auxiliary lock member is held at the auxiliary lock release position by a trigger. Therefore, it becomes unnecessary to confirm from the outside whether or not the holding member is located at the normal position or falls off, and high reliability is provided. In addition, it becomes unnecessary to handle the steering lock device more carefully than necessary, and it becomes easy to handle the same.

Moreover, the positional shift guide mechanism composed of the inclined portion and the inclination receiving portion is provided, whereby the external force applied to the side surface of the frame is converted into force to positionally shift the cover. Therefore, by the applied external force, the holding member positionally shifts, the tip end of the holding member is detached from the holding/receiving portion, and the auxiliary lock mechanism can be surely activated.

Therefore, erroneous activation of the auxiliary lock mechanism is prevented without complicating a configuration thereof, and the auxiliary lock mechanism can be provided with high reliability to ensure reliable activation when necessary.

Moreover, in the case where the cover is formed of the hard and flexible material, then in the event of being subjected to a trial of illegal unlocking, the cover is deformed before being broken or drilled, and the cover relative moves on the frame. Accordingly, the auxiliary lock mechanism can be activated more surely. Moreover, in the case where the cover is formed of a synthetic resin material that is provided with appropriate deformability (flexibility, resiliency) while being hard, then in the event of being subjected to the trial of the illegal unlocking, the cover is deformed before being broken or drilled, and the cover relatively moves on the frame. Accordingly, the auxiliary lock mechanism can be active more surely.

Moreover, in the case where the inclined portion is set so as to obliquely intersect the direction where the cover is assembled to the frame, then by the applied external force, the cover positionally shifts in the direction where the cover is detached therefrom, and falls off from the frame. In such a way, the tip end of the holding member is surely detached from the holding/receiving portion, and the auxiliary lock mechanism can be activated more surely.

Moreover, in the case where at least either one of the opposed surfaces of the frame-side engagement portion and the cover-side engagement portion is set so as to obliquely intersect the direction where the cover is assembled to the frame in the state where the cover is assembled to the frame, then in the event where the external force is applied to the cover while the cover is being fixedly arranged onto the frame, the frame-side engagement portion gets over the cover-side engagement portion, and the cover falls off from the frame. In such a way, the auxiliary lock mechanism can be activated more surely.

Moreover, the inclined portion is arranged on the region of the cover or the region of the frame, which is exposed without being surrounded by the peripheral vehicle equipment. In such a way, the inclined portion is arranged on a region likely to be aimed to be intentionally applied with the external force from the outside. Therefore, in the event where the external force is applied from the outside, the auxiliary lock mechanism can be activated more surely. Furthermore, on a region that is surrounded by the peripheral vehicle equipment and is less likely to be aimed from the outside, the inclined portion is not provided. In such a way, spots from which the cover is likely to fall off are reduced, and the auxiliary lock mechanism can be prevented from being erroneously activated in such a case where the force is applied thereto carelessly.

From the above, such activation reliability of the auxiliary lock mechanism can be further enhanced.

DESCRIPTION OF EMBODIMENTS

Figure 1:
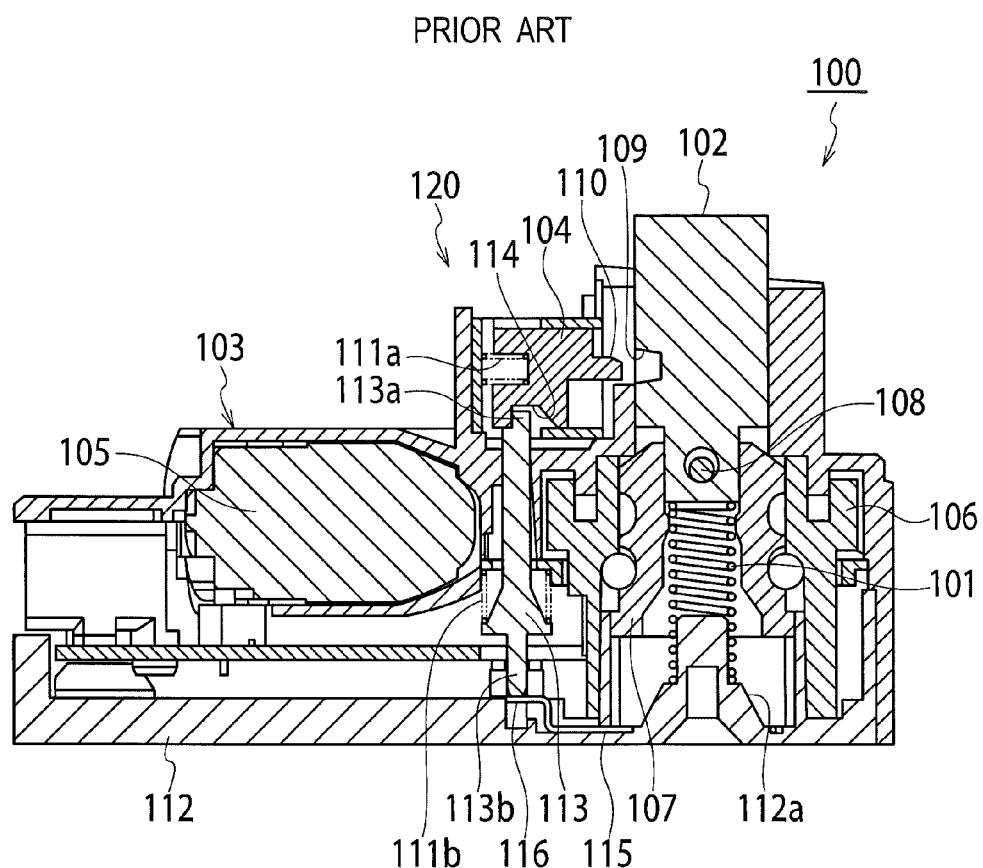
FIG. 1 is a cross-sectional view showing a steering lock state of a steering lock device of a conventional technology.
Figure 2:
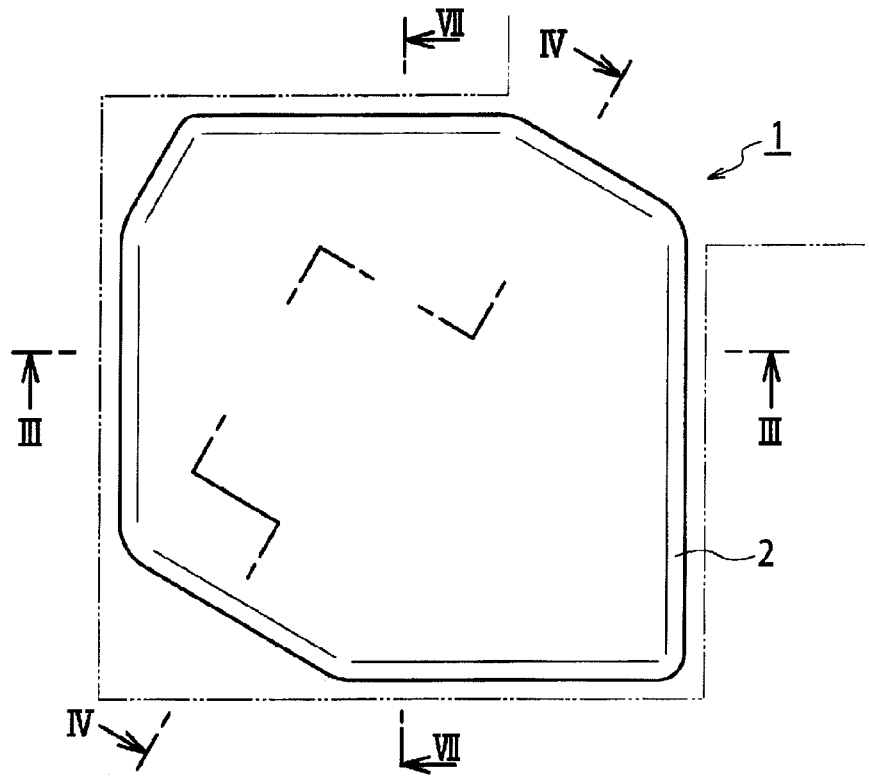
FIG. 2 shows a first embodiment of the present invention, and is a front view of a steering lock device.

A description is made below of embodiments of the present invention based on the drawings.

First Embodiment

As shown in FIG. 2 to FIG. 8, a steering lock device 1 of a first embodiment includes a cover 2 and a frame 3, which are assembled to each other, and is attached to a steering column device (not shown) that houses a steering shaft (not shown) of an automobile.

In an inside of the frame 3, there are formed: a component housing chamber 3a open toward one side (upper side of FIG. 3, FIG. 4 and the like); a lock housing hole 3b that penetrates the frame 3 from a bottom portion of the component housing chamber 3a to a steering column device A side, and is extended in a direction perpendicular to an axial direction of the steering shaft; and an auxiliary lock housing hole 3c extended in a direction orthogonal to this lock housing hole 3b. In addition, the frame 3 includes a pair of leg portions 3d and 3d arranged so as to straddle the steering column device A. In the lock housing hole 3b, a lock member 6 that holds a lock state of the steering shaft is housed. Moreover, in the component housing chamber 3a, a drive device is housed, which is composed of a motor (not shown) as a drive source, a worm wheel that rotates in a lock release direction and a lock direction by drive of a worm gear (not shown) of a rotation shaft of this motor, and the like, and moves the lock member 6 between a steering lock position and a steering lock release position. Then, in the auxiliary lock housing hole 3c, a slide plate (auxiliary lock member) 91 is housed, which composes auxiliary lock means 9 to be described later, and holds the lock member 6 at the steering lock position in the case where the cover 2 relatively moves from the frame 3. A cover fixing structure 4 is provided between the frame 3 and the cover 2, and the cover is fixed to the frame 3 by the cover fixing structure 4. Note that the cover 2 is formed of a nylon material as a synthetic resin material. The nylon material is provided with appropriate deformability (flexibility, resiliency) while being hard. Accordingly, in the event of being subjected to a trial of illegal unlocking, the cover 2 is deformed before being broken or drilled, and the cover 2 relatively moves on the frame 3.

Figure 7:
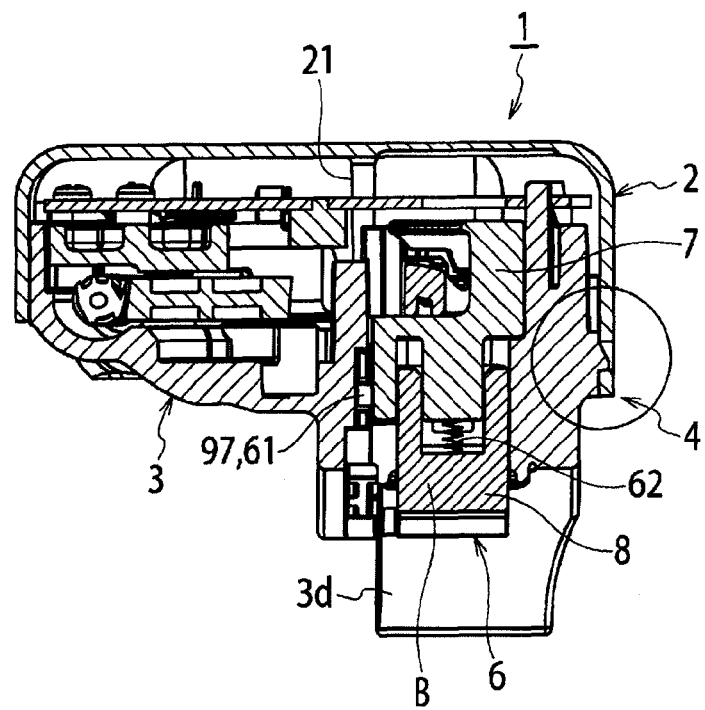
FIG. 7 shows the first embodiment of the present invention, and is a cross-sectional view taken along the line VII-VII of FIG. 2, showing the steering lock state of the steering lock device.
Figure 8:
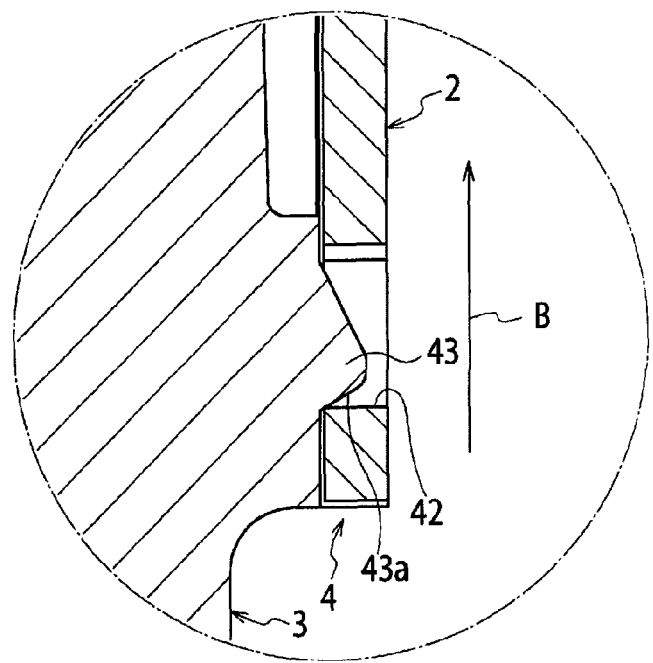
FIG. 8 shows the first embodiment of the present invention, and is a main portion enlarged view of FIG. 7.

As shown in FIG. 7, the lock member 6 is composed of: a hanger 7 that composes a base end side of the lock member 6, and engages with a slide member 5; a lock body 8 that composes a tip end side of the lock member 6, is coupled to the hanger 7, and has a tip end fittable to the steering shaft by protruding from a bottom surface of the frame 3; a coiled spring 62 as an urging member that is interposed between the hanger 7 and the lock body 8, and urges the lock body 8 from a steering lock release position side toward a steering position side; and a coupling pin 61 that couples the hanger 7 and the lock body 8 to each other. Moreover, the lock member 6 has a wide surface B parallel to the axial direction of the steering shaft, and a thick surface C perpendicular to the wide surface B. On the thick surface C, a projection (auxiliary engagement portion) 97 composed of an end portion of the coupling pin 61 is provided.

Figure 4:
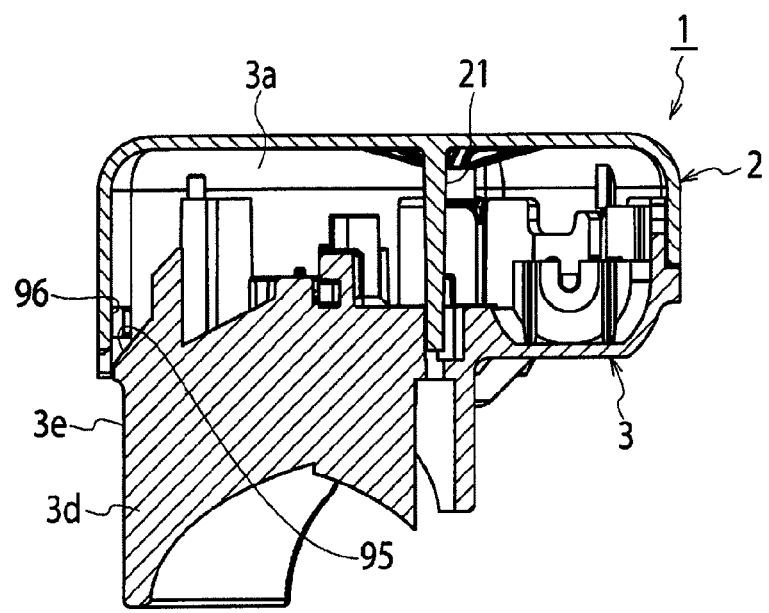
FIG. 4 shows the first embodiment of the present invention, and is a cross-sectional view taken along a line IV-IV of FIG. 2, showing the steering lock state of the steering lock device.
Figure 6:
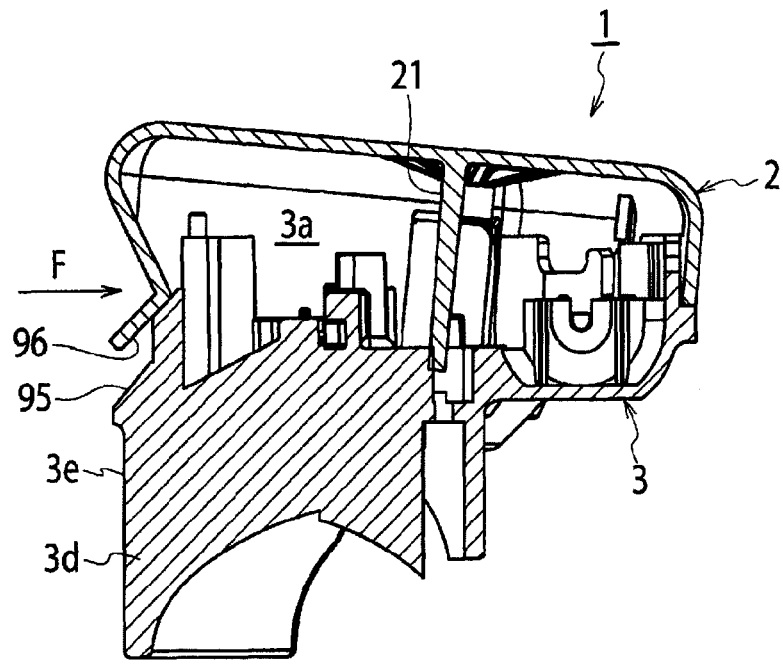
FIG. 6 shows the first embodiment of the present invention, and is a cross-sectional view taken along the line IV-IV of FIG. 2, showing a state where the external force is applied to the steering lock device in the steering lock state from the side surface thereof.

The auxiliary lock means 9 is composed of: the slide plate 91 extended from the wide surface B of the lock member 6 in a plate thickness direction; a coiled spring (urging member) 92 that urges the slide plate 91 toward an auxiliary lock position in a direction of the projection 97 of the lock member 6; a holding shaft (holding member) 21 protruded on an inner surface of the cover 2; an inclined portion 95 set on an outside of an opening edge of the frame 3; and an inclination receiving portion 96 set in an inside of an opening edge of the cover 2 (refer to FIG. 4 and FIG. 6).

Figure 3:
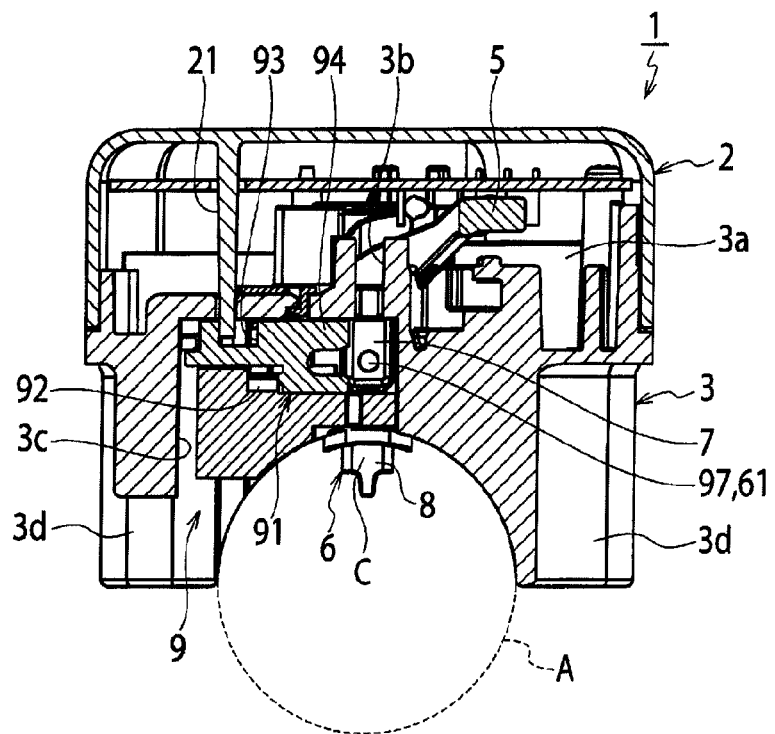
FIG. 3 shows the first embodiment of the present invention, and is a cross-sectional view taken along a line of FIG. 2, showing a steering lock state of a steering lock device.

The slide plate 91 and the coiled spring 92 are arranged more on the outside than the wide surface B of the lock member 6 so as to be slidable between the auxiliary lock position where the slide plate 91 engages with the projection of the lock member located at the steering lock position and an auxiliary lock release position where the slide plate 91 is spaced apart from the projection and allows a slide of the lock member. Moreover, as shown in FIG. 3, on one end side of the slide plate 91, an engagement recessed portion (holding/receiving portion) 93 is formed, with which a tip end of the holding shaft 21 protruding to the inside from the back surface of the cover 2 engages. On other end of the slide plate 91, a bifurcated engagement end portion 94 is formed, which receives the projection 97 in a manner of sandwiching the same from upper and lower sides.

The holding shaft 21 is formed into a shaft shape, and is formed integrally with the cover 2 on the inner surface of the cover 2 provided with a box shape in which one surface is open. Then, with regard to the holding shaft 21, in a state where the cover 2 is assembled to the frame 3, the tip end of the holding shaft 21 concerned engages with the engagement recessed portion 93 of the slide plate 91 located at the auxiliary lock release position, and the slide plate 91 is held at the auxiliary lock release position. Moreover, when the cover 2 falls off from the frame 3, the engagement between the holding shaft 21 and the engagement recessed portion 93 is disengaged, and the slide plate 91 moves to the auxiliary lock position by urging force of the coiled spring 92.

Together with the inclination receiving portion 96, the inclined portion 95 composes a positional shift guide mechanism that guides a positional shift of the cover 2. The inclined portion 95 is provided on the outside of the opening edge of a region of the frame 3, which is exposed without being surrounded by peripheral vehicle equipment in a state where the steering lock device 1 is attached to the vehicle. Moreover, the inclined portion 95 is composed of a tapered inclined surface set so as to obliquely intersect an outer side surface 3e coming close thereto, that is, so as to obliquely intersect a direction where the cover 2 is assembled to the frame 3 while facing to the cover 2. Moreover, a region in the inside of the opening edge of the cover 2, which is opposed to the inclined portion 95 in the state where the cover 2 is assembled to the frame 3, is set on the inclination receiving portion 96. Then, the positional shift guide mechanism has a configuration in which, in the event where excessive force F is applied toward the inclined portion 95 from a side of the frame 3, the inclination receiving portion 96 slides on the inclined portion 95 while a side surface of the cover 2 is being deformed, and such external force is converted into force in a direction where the cover 2 falls off from the frame 3. That is to say, the external force F applied to the side surface of the frame is converted into force to positionally shift the cover by the positional shift guide mechanism.

The cover fixing structure 4 is provided in a region where the cover 2 and the frame 3 are opposed to and abut against each other in the state where the cover 2 is assembled to the frame 3. Moreover, the cover fixing structure 4 is composed of: a frame-side engagement portion 43 arranged on such an outer side surface of the frame 3; and a cover-side engagement portion 42 arranged on an inner side surface of the cover 2. Moreover, the frame-side engagement portion 43 is set so that, in the state where the cover 2 is assembled to the frame 3, an engagement surface 43a thereof to be opposed to and engage with the cover-side engagement portion 42 can obliquely intersect the direction where the cover 2 is assembled to the frame 3. Then, such a configuration as follows is adopted. In the event where the cover 2 is assembled to the frame 3, the cover-side engagement portion 42 and the frame-side engagement portion 43 engage with each other, and the cover 2 is fixed to the frame 3, and in the event where the excessive force F is applied to the cover 2, the cover-side engagement portion 42 gets over the engagement surface 43a, moves in a direction of arrow B in FIG. 8, the engagement between the cover-side engagement portion 42 and the frame-side engagement portion 43 is disengaged, and the cover 2 falls off from the frame 3.

Next, a description is made of operations of the above-described steering lock device 1. At the time of the steering lock of the lock body 8 shown in FIG. 3, the lock body 8 coupled to the hanger 7 is located at the steering lock position by the drive device (not shown), and the lock body 8 protrudes downward from the bottom surface of the frame 3, and is fitted to the steering shaft. As a result, rotation of the steering shaft is inhibited, and accordingly, the automobile is kept in an unsteerable state. Moreover, in the case where the lock of the steering shaft is released from the above-described lock state, then by the drive device, the lock body 8 separates from the steering shaft in interlocking therewith, the lock body 8 is retreated into the frame 3, and positionally shifts to the steering lock release position, and the rotation of the steering shaft is allowed. Accordingly, the automobile turns to a steerable state.

Figure 5:
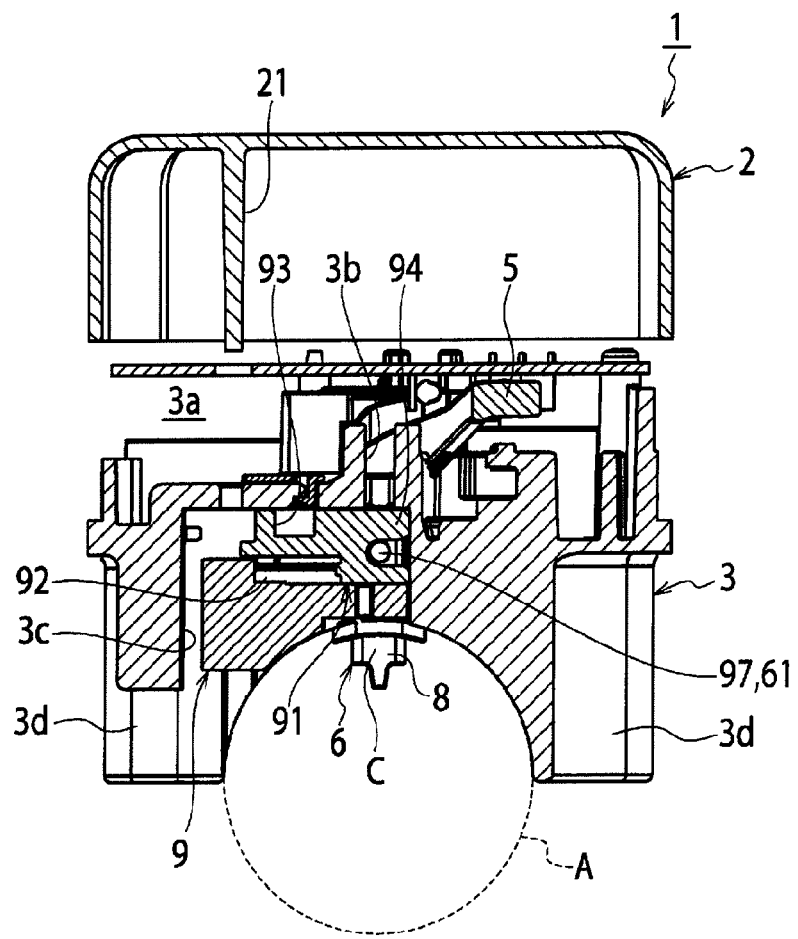
FIG. 5 shows the first embodiment of the present invention, and is a cross-sectional view taken along the line of FIG. 2, showing a state where external force is applied to the steering lock device in the steering lock state from a side surface thereof.

Then, in the above-described steering lock state, as shown in FIG. 5, the slide plate 91 is urged to and held on an auxiliary lock position side by the urging force of the coiled spring 92. Therefore, in the event where the cover 2 is detached from the frame 3 by an illegal action, the holding shaft 21 of the cover 2 separates from the engagement recessed portion 93 of the slide plate 91. As a result, the slide plate 91 moves from the auxiliary lock release position to the auxiliary lock position, and the engagement end portion 94 of the slide plate 91 engages with the projection 97 of the lock body 8 in the manner of sandwiching the same from the upper and lower sides. In such a way, movement of the lock member 6 (hanger 7 and lock body 8) is inhibited, and the steering lock state by the lock body 8 is held.

Moreover, in the event where the illegal unlocking is attempted, and the excessive external force F is applied from the side of the frame 3 to a region of the cover, which is exposed without being surrounded by the peripheral vehicle equipment, then from the state where the opening edge of the cover 2 abuts against the side surface of the frame, the inclination receiving portion 96 slides on the inclined portion 95 while the side surface of the cover is being deformed, the external force F is converted into the force in the direction where the cover 2 falls off from the frame 3, and the cover 2 falls off from the frame 3. In such a way, the holding shaft 21 of the cover 2 separates from the engagement recessed portion 93 of the slide plate 91, the slide plate 91 moves from the auxiliary lock release position to the auxiliary lock position, and the engagement end portion 94 of the slide plate 91 engages with the projection 97 of the lock body 8 in the manner of sandwiching the same from the upper and lower sides. Accordingly, the movement of the lock member 6 (hanger 7 and lock body 8) is inhibited, and the steering lock state by the lock body 8 is held.

As described above, in this embodiment, the holding shaft 21 is fixed to the cover 2, whereby the cover 2 is assembled to a normal assembly position. In such a way, it is clarified that the slide plate 91 is held at the auxiliary lock release position by the holding shaft 21. Therefore, it becomes unnecessary to confirm from the outside whether or not the holding shaft 21 is located at the normal position or falls off, and high reliability is provided. In addition, it becomes unnecessary to handle the steering lock device more carefully than necessary, and it becomes easy to handle the same.

Moreover, the inclined portion 95 and the inclination receiving portion 96 are provided, whereby the external force applied to the side surface of the frame 3 is converted into the force to positionally shift the cover 2 in the direction where the cover 2 is detached therefrom. Therefore, even if the applied external force is weak, the cover 2 relatively moves from the frame 3, in addition, the tip end of the holding shaft 21 is detached from the engagement recessed portion 93, and the auxiliary lock means 9 can be surely activated.

The cover 2 is formed of a nylon material that is provided with appropriate deformability (flexibility, resiliency) while being hard. In such a way, in the event where the illegal unlocking is attempted, and the external force is intentionally applied from the outside to the cover 2, then the cover 2 is deformed before being broken or drilled, the cover 2 relatively moves on the frame 3, and in addition, the tip end of the holding shaft 21 is detached from the engagement recessed portion 93. In such a way, the auxiliary lock means 9 can be activated more surely.

The engagement surface 43a of the frame-side engagement portion 43 that composes the cover fixing structure 4 is set so as to obliquely intersect the direction where the cover 2 is assembled to the frame 3. In such a way, in the event where the external force is applied to the cover 2 while the cover 2 is being fixedly arranged onto the frame 3, the frame-side engagement portion 43 gets over the cover-side engagement portion 42, and the cover 2 falls off from the frame 3. Hence, the auxiliary lock means 9 can be activated more surely.

The inclined portion 95 is arranged on the region of the cover 2 or the region of the frame 3, which is exposed without being surrounded by the peripheral vehicle equipment. In such a way, the inclined portion 95 is arranged on a region likely to be aimed in the event where the illegal unlocking is attempted and the external force is intentionally applied thereto from the outside. Therefore, in the event where the external force is applied from the outside, the auxiliary lock means 9 can be activated more surely.

Moreover, on a region that is surrounded by the peripheral vehicle equipment and is less likely to be aimed from the outside, the inclined portion 95 is not provided. In such a way, spots from which the cover 2 is likely to fall off are reduced, and the auxiliary lock means can be prevented from being erroneously activated in such a case where the force is applied thereto carelessly.

From the above, the erroneous activation of the auxiliary lock means is prevented without complicating the configuration thereof, and the auxiliary lock means can be provided with high reliability to ensure reliable activation when necessary.

Note that, in this embodiment, the inclined portion 95 and the inclination receiving portion 96 are arranged and set on only the region exposed without being surrounded by the peripheral vehicle equipment. However, without being limited to this, in such a case where the whole of the steering lock device 1 is exposed without being surrounded by the vehicle equipment, then a configuration may be adopted, in which the inclined portion 95 and the inclination receiving portion 96 are arranged and set on the whole of the side surface.

Another Aspect of First Embodiment

Figure 9:
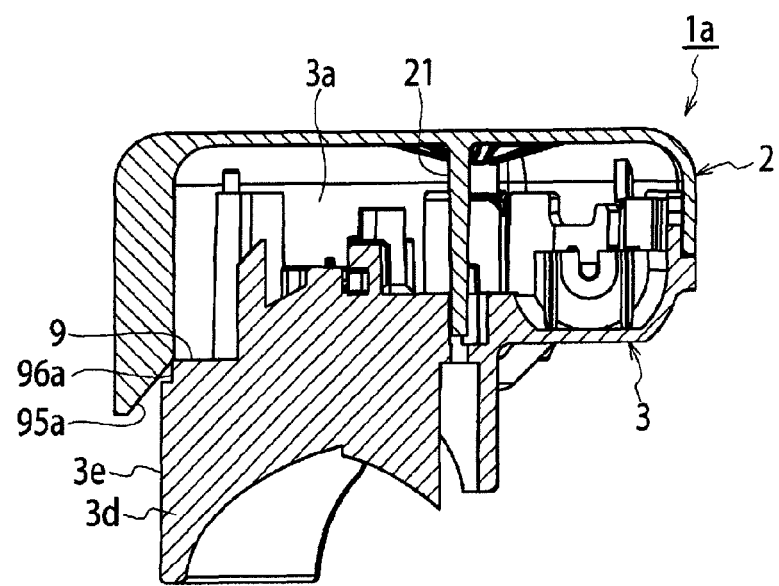
FIG. 9 shows another aspect of the first embodiment of the present invention, and is a cross-sectional view corresponding to the line IV-IV of FIG. 2, showing a steering lock state of a steering lock device.

FIG. 9 shows another aspect of the first embodiment of the present invention, and is a cross-sectional view showing a steering lock device. Largely different points of this aspect from the above-described first embodiment in configuration are an inclined portion 95a and an inclination receiving portion 96a, which compose the positional shift guide mechanism. The same reference numerals are assigned to similar constituents to those of the above-described first embodiment, and a detailed description thereof is omitted.

The inclined portion 95a is provided in an inside of an opening edge of a region of the cover 2, which is exposed without being surrounded by the peripheral vehicle equipment in a state where a steering lock device 1a is attached to the vehicle. Moreover, the inclined portion 95a is composed of a tapered inclined surface set so as to obliquely intersect an outer side surface 3e coming close thereto, that is, so as to obliquely intersect a direction where the cover 2 is assembled to the frame 3 while facing to the cover 2. Moreover, a region on an outside of an opening edge of the frame 3, which is opposed to the inclined portion 95a in a state where the cover 2 is assembled to the frame 3, is set on the inclination receiving portion 96a. Then, the positional shift guide mechanism has a configuration in which, in the event where the excessive force is applied toward the inclined portion 95a from a side of the frame 3, the inclination receiving portion 96a slides on the inclined portion 95a, and such external force is converted into force applied in the direction where the cover 2 falls off from the frame 3. That is to say, this aspect has a configuration in which the inclined portion 95 and the inclination receiving portion 96 in the above-described first embodiment are exchanged with each other.

As described above, in this aspect, similar functions and effects to those of the above-described first embodiment can be obtained. In addition, the inclined portion 95a is provided on the cover 2, whereby rigidity of the region of the cover 2, to which the external force is applied, is enhanced in such a manner that the region concerned is formed thick, and accordingly, breakage of the cover 2 in the event where the external force is applied to the cover 2 is prevented, and the inclined portion 95 can slide on the inclination receiving portion 96a more surely. In such a way, the external force applied to the surface of the frame 3 can be converted more surely into the force to positionally shift the cover 2 in the direction where the cover 2 is detached therefrom.

Note that, though the configuration in which the inclined surface is provided on only the inclined portion is adopted in the above-described first embodiment and this aspect, a configuration in which an inclined surface similar to that of the inclined portion is also provided on the inclination receiving portion may be adopted.

Second Embodiment

Figure 10:
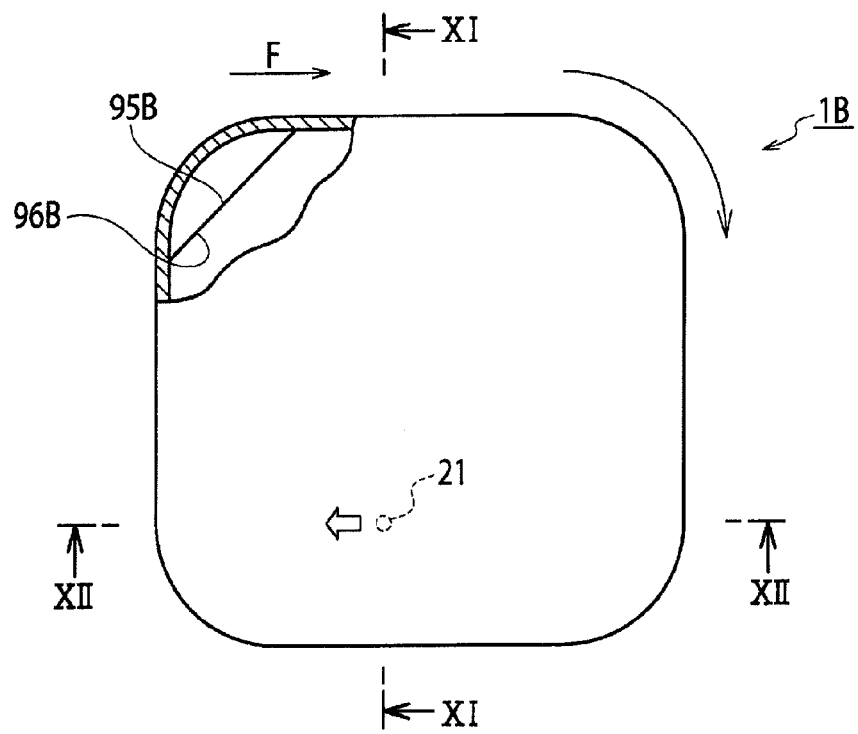
FIG. 10 shows a second embodiment of the present invention, and is a front view of a steering lock device.
Figure 11:
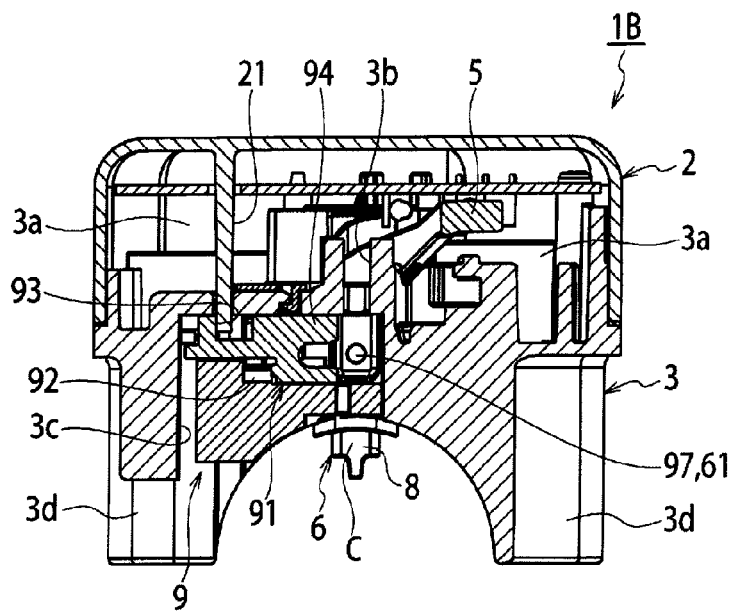
FIG. 11 shows the second embodiment of the present invention, and is a cross-sectional view taken along a line XI-XI of FIG. 10, showing a steering lock state of the steering lock device.
Figure 12:
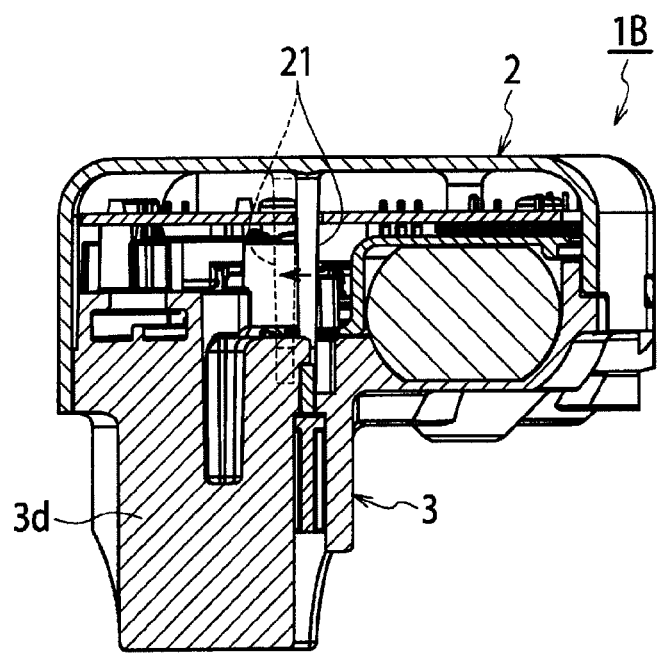
FIG. 12 shows the second embodiment of the present invention, and is a cross-sectional view taken along a line XII-XII of FIG. 10, showing the steering lock state of the steering lock device.

FIG. 10 to FIG. 12 show a second embodiment of the present invention, and are cross-sectional views showing a steering lock device. Largely different points of this second embodiment from the above-described first embodiment are configurations and activation directions of an inclined portion 95B and an inclination receiving portion 96B, which compose the positional shift guide mechanism. The same reference numerals are assigned to similar constituents to those of the above-described first embodiment, and a detailed description thereof is omitted.

The inclined portion 95B is provided on the outside of the opening edge of the region of the frame 3, which is exposed without being surrounded by the peripheral vehicle equipment in a state where a steering lock device 1B is attached to the vehicle. Moreover, the inclined portion 95B is composed of a tapered inclined surface set so as to obliquely intersect the outer side surface 3e coming close thereto, that is, so as, while facing to the cover 2, to obliquely intersect a direction where the cover 2 rotates on the frame 3 along a matching surface between the cover 2 and the frame 3. Furthermore, the inclination receiving portion 96B is set on a region in an inside of an opening edge of a corner portion of the cover 2, which is opposed to the inclined portion 95B in the state where the cover 2 is assembled to the frame 3. Note that the holding shaft 21 is arranged at a region other than a rotation center in the event where the cover 2 rotates.

With such a configuration, in the event where the illegal unlocking is attempted, and the excessive external force F is applied from the side of the frame 3 to the region of the cover, which is exposed without being surrounded by the peripheral vehicle equipment, then the inclination receiving portion 96B slides on the inclined portion 95B while the side surface of the cover 2 is being deformed, the external force is converted into force in the direction where the cover 2 rotates on the frame 3, and the cover 2 rotates on the frame 3 while an opening portion of the cover 2 is being deformed. In such a way, the holding shaft 21 of the cover 2 separates from the engagement recessed portion 93 of the slide plate 91, the slide plate 91 moves from the auxiliary lock release position to the auxiliary lock position, and the engagement end portion 94 of the slide plate 91 engages with the projection 97 of the lock body 8 in the manner of sandwiching the same from the upper and lower sides. Accordingly, the movement of the lock member 6 (hanger 7 and lock body 8) is inhibited, and the steering lock state by the lock body 8 is held.

As described above, in this embodiment, similar functions and effects to those of the above-described first embodiment can be obtained, in addition, the external force F can be converted not only into the force in the direction where the cover 2 falls off from the frame 3 but also into the force in the direction where the cover 2 rotates on the frame 3.

Hence, the auxiliary lock means 9 can be activated more surely, and accordingly, the erroneous activation is prevented without complicating the configuration thereof, and the auxiliary lock means can be provided with high reliability to ensure the reliable activation when necessary.

Note that, in this embodiment, the configuration in which the inclined surface is provided on only the inclined portion; however, an inclined surface similar to that of the inclination receiving portion of another aspect described above may be provided on the inclination receiving portion, and setting may be made so that the inclined portion and the inclined surface of the inclination receiving portion can be opposed to each other.

The invention claimed is:

1. A steering lock device comprising:
 a cover;
 a frame covered with the cover;
 a lock member arranged in the frame freely movably between a steering lock position and a steering lock release position; and
 an auxiliary lock mechanism operable in response to a load from the cover so as to hold the lock member at the steering lock position at an illegal unlocking,
 wherein an inclined portion is formed on either one of an inside of the opening edge of the cover and an outside of an opening edge of the frame, and an inclination receiving portion is formed on the other of the inside of the opening edge of the cover and the outside of the opening edge of the frame, and
 wherein the cover has an urging force toward the inside of the opening edge of the cover.

2. The steering lock device according to claim 1, wherein the cover is formed of a hard and flexible material.

3. The steering lock device according to claim 1, wherein the cover is formed of a synthetic resin material.

4. The steering lock device according to claim 1, wherein the inclined portion is set to obliquely intersect a direction where the cover is assembled to the frame.

5. The steering lock device according to claim 1, further comprising:
 a cover fixing structure composed of a frame-side engagement portion arranged on the side surface of the frame and of a cover-side engagement portion that is arranged on an inner side surface of the cover and is engaged with the frame-side engagement portion in the state where the cover is assembled to the frame,
 wherein, in the state where the cover is assembled to the frame, at least either one of opposed surfaces of the frame-side engagement portion and the cover-side engagement portion is set to obliquely intersect the direction where the cover is assembled to the frame.

6. The steering lock device according to claim 1, wherein the inclined portion is arranged on a region of the cover or of the frame, the region being exposed without being surrounded by peripheral vehicle equipment in a state where the steering lock device is attached to a vehicle.

7. A steering lock device comprising:
 a cover;
 a frame covered with the cover, the frame being provided with a rod guide hole;
 a lock member arranged in the rod guide hole freely slidably between a steering lock position and a steering lock release position, the rod guide hole being provided in the frame;
 an auxiliary lock mechanism including
 an auxiliary engagement portion provided on the lock member,
 an auxiliary lock member that is arranged in the frame freely slidably between an auxiliary lock position and an auxiliary lock release position, and is urged by an urging member to a lock position side of engaging with the auxiliary engagement portion, and
 a holding member having one end fixed to the cover, in which, in a state where the cover is assembled to the frame, a tip end of the holding member makes engagement with a holding/receiving portion of the auxiliary lock member located at the auxiliary lock release position, and holds the auxiliary lock member at the auxiliary lock release position, and in an event where the cover relatively moves from the frame, the engagement with the holding/receiving portion is disengaged; and
 a positional shift guide mechanism including
 an inclined portion set on either one of an outside of an opening edge of the frame and an inside of the opening edge of the cover, the inclined portion being set to obliquely intersect an outer side surface coming close thereto, and
 an inclination receiving portion set on a region opposed to the inclined portion, the region belonging to other of the outside of the opening edge of the frame and the inside of the opening edge of the cover, the inclination receiving portion being set to enable the inclined portion to slide thereon.

* * * * *